(12) United States Patent
Guardini et al.

(10) Patent No.: US 10,742,704 B2
(45) Date of Patent: Aug. 11, 2020

(54) METHOD AND APPARATUS FOR AN ADAPTIVE VIDEO-AWARE STREAMING ARCHITECTURE WITH CLOUD-BASED PREDICTION AND ELASTIC RATE CONTROL

(71) Applicant: Cinova Media, Mountain View, CA (US)

(72) Inventors: Domenico Guardini, Mountain View, CA (US); Pierre Seigneurbieux, Mountain View, CA (US)

(73) Assignee: Cinova Media, Redwood City, CA (US)

( * ) Notice: Subject to any disclaimer, the term of this patent is extended or adjusted under 35 U.S.C. 154(b) by 0 days.

(21) Appl. No.: 16/027,975

(22) Filed: Jul. 5, 2018

(65) Prior Publication Data

US 2019/0173929 A1    Jun. 6, 2019

Related U.S. Application Data

(60) Provisional application No. 62/528,911, filed on Jul. 5, 2017.

(51) Int. Cl.
*G06F 13/00* (2006.01)
*H04L 29/06* (2006.01)

(52) U.S. Cl.
CPC ........ *H04L 65/601* (2013.01); *H04L 65/4069* (2013.01); *H04L 65/4092* (2013.01); *H04L 65/605* (2013.01); *H04L 65/607* (2013.01); *H04L 65/80* (2013.01)

(58) Field of Classification Search
CPC . H04L 65/601; H04L 65/607; H04L 65/4069; H04L 65/80; H04L 65/605; H04L 65/4092; H04N 21/2662
USPC ................ 709/231, 232, 233–235, 203
See application file for complete search history.

(56) References Cited

U.S. PATENT DOCUMENTS

| | | | |
|---|---|---|---|
| 10,482,653 B1 * | 11/2019 | Xu | H04N 21/23406 |
| 10,595,069 B2 * | 3/2020 | Swaminathan | H04N 21/4621 |
| 2017/0302918 A1 * | 10/2017 | Mammou | H04N 19/103 |
| 2018/0160160 A1 * | 6/2018 | Swaminathan | H04N 21/2662 |
| 2018/0192058 A1 * | 7/2018 | Chen | H04N 19/119 |
| 2018/0262687 A1 * | 9/2018 | Hildreth | H04N 13/204 |
| 2019/0102944 A1 * | 4/2019 | Han | G06T 19/006 |
| 2019/0113966 A1 * | 4/2019 | Connellan | G06F 3/011 |
| 2020/0050884 A1 * | 2/2020 | Han | G06K 9/4676 |

* cited by examiner

*Primary Examiner* — Kenneth R Coulter
(74) *Attorney, Agent, or Firm* — DLA Piper LLP

(57) ABSTRACT

A method and apparatus for an adaptive video-aware streaming architecture are disclosed. The architecture may include cloud-based prediction and elastic rate control.

18 Claims, 6 Drawing Sheets

METHOD AND APPARATUS FOR AN ADAPTIVE VIDEO-AWARE STREAMING ARCHITECTURE WITH CLOUD-BASED PREDICTION AND ELASTIC RATE CONTROL

PRIORITY CLAIMS/RELATED APPLICATIONS

This application claims the benefit under 35 USC 119(e) to U.S. Provisional Patent Application Ser. No. 62/528,911, filed Jul. 5, 2017 and entitled "Method And Apparatus For An Adaptive Video-Aware Streaming Architecture With Cloud-Based Prediction And Elastic Rate Control", the entirety of which is incorporated herein by reference.

FIELD

The field relates generally to video processing and in particular virtual reality video processing in the context of an adaptive video aware streaming architecture.

BACKGROUND

Field Of View (FOV) based Virtual Reality streaming is a very difficult exercise as it requires a very low delay response on the user end in order to maximize the user experience. For example, when dealing with 60 frames per second content that is sent as a FOV, it is required that the correct FOV mapping to the current headset position is rendered on time every 16 ms. A typical system with a server and a client, such as a typical virtual reality data streaming system, cannot guarantee less than a 16 ms time for communications so that typical virtual reality data streaming system have a technical problem. The technical problem is the lack of an architecture that is able to ensure less than 16 ms response times and the result of the technical problem is poor user experience including the user waiting for the VR system to download the FOVs.

Because standard round trip times between a server and a client cannot insure less than 16 ms consistently, it is important to design a network layer for VR that allows the user to not feel the delay incurred by the nature of the network between the server and the player's headset and it is to this end that the disclosure is directed.

DETAILED DESCRIPTION OF ONE OR MORE EMBODIMENTS

The disclosure is particularly applicable to a streaming virtual reality system that may use a field of view (FOV) based client/server type architecture and it is in this context that the disclosure will be described. It will be appreciated, however, that the virtual reality architecture has greater utility since it may be used with other streaming virtual reality systems that may utilize a different architecture (peer to peer, single computer, mainframe computer, etc.) and also may be used with other systems in which it is desirable to be able to utilize a zero delay network architecture.

A system, method and architecture for a zero-delay network architecture driven by the headset prediction and refined through advanced cloud-based prediction and machine learning are provided. The architecture may include an abstraction network layer that takes advantage of network and video awareness for optimal error resilience (including recovery of lost packets) and best use of bandwidth to insure superior video quality. The architecture may also include video rate control of an encoder so that the encoder may be adjusted in an elastic manner to optimally adapt to the prediction quality vs. the current network delay. In more detail, the system and method may include FOV prediction for Virtual Reality and optimal adaptive bitrate streaming for FOV-based VR streaming.

Figure 1:
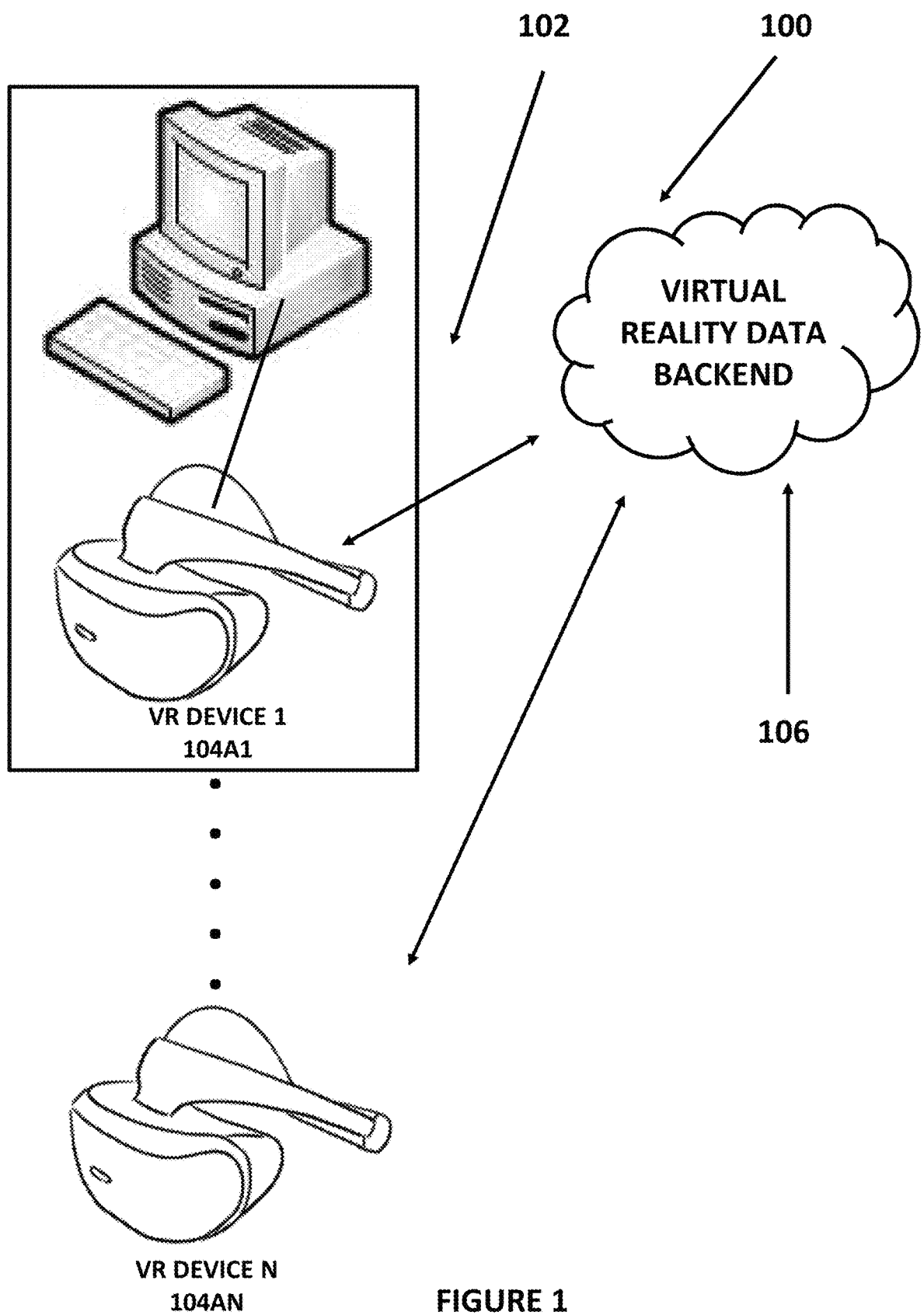
FIG. 1 illustrates an example of a streaming virtual reality system that may incorporate an adaptive video aware streaming architecture.

FIG. 1 illustrates a streaming virtual reality system 100 having a plurality of virtual reality devices 102 and a virtual reality data backend 106 that are coupled together by a communication path that the system 100 may utilize include the zero delay network architecture. The communication path between each virtual reality device 102 and the backend 106 may be a wired or wireless network, a cellular data network, a wireless computer data network, an Ethernet or optical data connection and the like. The communications path between each virtual reality device 102 and the backend 106 may be different (or have different components) and thus the communications path between each virtual reality device 102 and the backend 106 may each have different network latency.

In a streaming system as shown in FIG. 1, the backend 106 may receive data from each virtual reality device (including positioning/orientation data for the virtual reality device and/or network congestion data) and may perform frame accurate field of view switching for virtual reality. It is noted that the frame accurate field of view switching for virtual reality disclosed below also may be implemented in other virtual reality systems (that for example may not stream the virtual reality data but graphic rendering commands for example) and the streaming virtual reality system shown in FIG. 1 is just illustrative since the system and method may be used with any system in which it would be desirable to provide frame accurate field of view switching for virtual reality.

Each virtual reality device 102 may be a device that is capable of receiving virtual reality streaming data, processing the virtual reality streaming data (including possibly decompressing that data and partial FOV switching in some implementations as described below) and displaying the virtual reality streaming data to a user using some type of virtual reality viewing device. Each virtual reality device may further directly deliver an immersive visual experience to the eyes of the user based on positional sensors of the virtual reality device that detects the position of the virtual reality device and affects the virtual reality data being displayed to the user. Each virtual reality device 102 may include at least a processor, memory, one or more sensors for detecting and generating data about a current position/orientation of the virtual reality device 102, such as an accelerometer, etc., and a display for displaying the virtual reality streaming data. For example, each virtual reality device 102 may be a virtual reality headset, a computer having an attached virtual reality headset, a mobile phone with virtual reality viewing accessory or any other plain display device capable of displaying video or images. For example, each virtual reality device 102 may be a computing device, such as a smartphone, personal computer, laptop computer, tablet computer, etc. that has an attached virtual reality headset 104A1, or may be a self-contained virtual reality headset 104AN. Each virtual reality device 102 may have a player (that may be an application with a plurality of lines of computer code/instructions executed by a processor of the virtual reality device) that may process the virtual reality data and play the virtual reality data.

The system 100 may further comprise the backend 106 that may be implemented using computing resources, such as a server computer, a computer system, a processor, memory, a blade server, a database server, an application server and/or various cloud computing resources. The backend 106 may be implemented using a plurality of lines of computer code/instructions that may be stored in a memory of the computing resource and executed by a processor of the computing resource so that the computer system with the processor and memory is configured to perform the functions and operations of the system as described below. The backend 106 may also be implemented as a piece of hardware that has processing capabilities within the piece of hardware that perform the backend virtual reality data functions and operations described below. Generally, the backend 106 may receive a request for streamed virtual reality data for a virtual reality device (that may contain data about the virtual reality device) and perform the technical task of virtual reality data preparation (using one or more rules or lines of instructions/computer code). The VR data preparation may include generating the stream of known in view and out of view virtual reality data as well as the one or more pieces of optimized virtual reality data based on each request for streamed virtual reality data for each virtual reality device 102. The backend 106 may then stream that optimized streamed virtual reality data to each virtual reality device 102 that requested the virtual reality data. The optimized streamed virtual reality data is used to solve the technical problems of poor and noticeable VR data quality in VR systems as described above.

Figure 2:
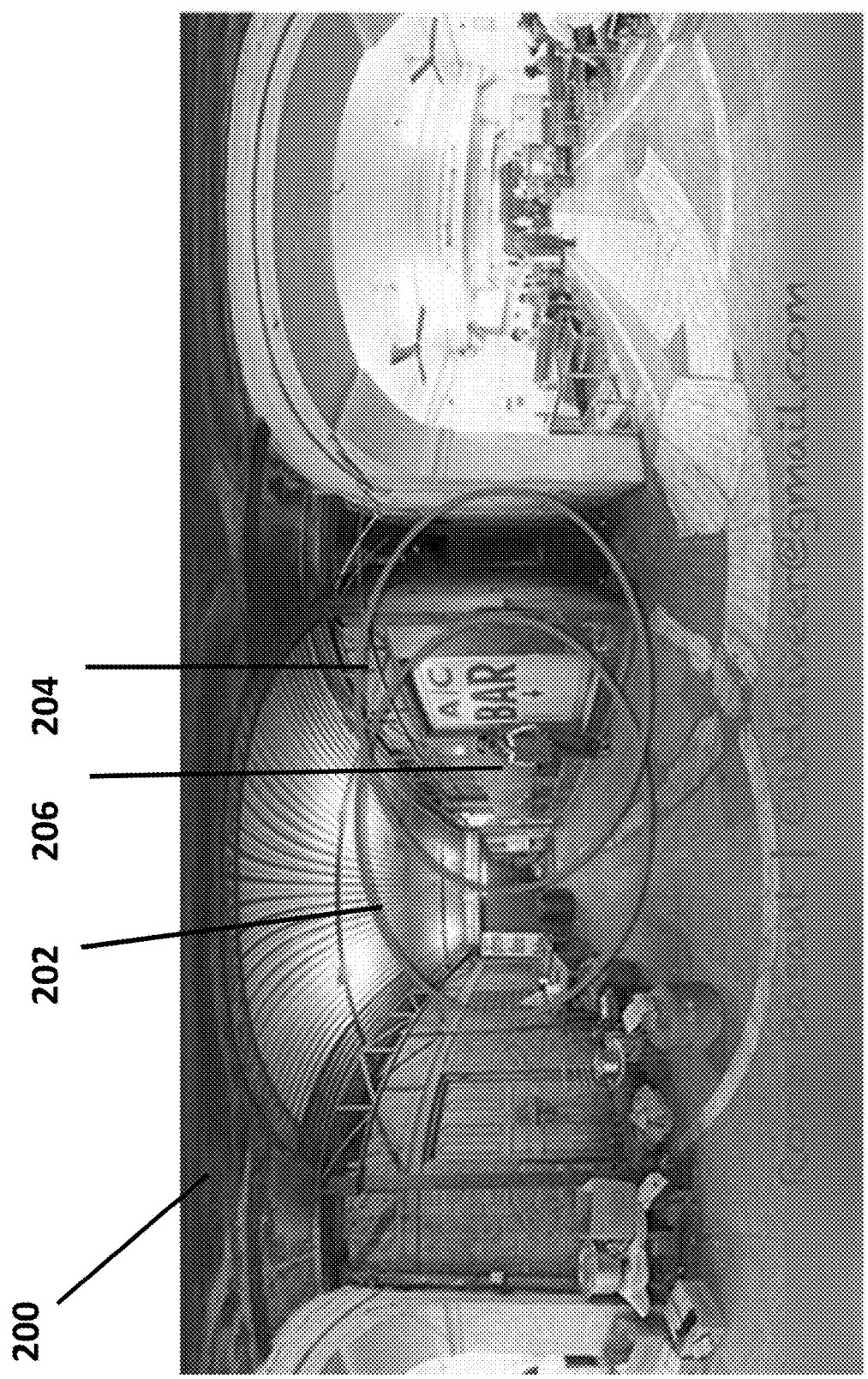
FIG. 2 illustrates an example of virtual reality data and a field of view.

FIG. 2 illustrates an example of a frame of virtual reality data 200, a view of each eye of the virtual reality device 202, 204 and a viewpoint 206 (also known as an "in-view portion" or "field of view"). In a typical virtual reality streaming system, the virtual reality data may be a plurality of frames of virtual reality data that may be compressed using various compression processes such as MPEG or H.264 or H.265. For purposes of illustration, only a single frame is shown in FIG. 2, although it is understood that the processes described below may be performed on each frame of virtual reality streaming data. In a virtual reality streaming data system, a viewer/user typically views this frame of virtual data (that is part of the virtual reality data video or virtual reality streamed data (collectively the "asset") using the virtual reality device 102 that plays back only a section of the whole frame/video based on the direction in which the virtual reality device 102 is positioned by the user who is wearing the device that may be determined by the sensors/elements of the device 102. As shown in FIG. 2, based on the direction/position of the virtual reality device, a certain portion of the frame, such as a left eye view portion 202 and a right eye portion 204 may be within the view of the user of the virtual reality device 102. For example, the virtual reality device may provide a viewport that has the left eye view portion 202, the right eye view portion 204 as shown by the overlapping ovals shown in FIG. 2 and a central region 206 (the field of view) that is displayed to both eyes of the user similar to how a human being's eyes operate so that the virtual reality system provides an immersive experience for the user. Depending upon the configuration of the virtual reality device, the field of view of the virtual reality device determines the specific portion of the frame that needs to be displayed to each eye of the user. As an example, a virtual reality device with a 90-degree horizontal and vertical field of view, will only display about $\frac{1}{4}^{th}$ of the frame in the horizontal direction and ½ of the frame in the vertical direction.

Figure 3:
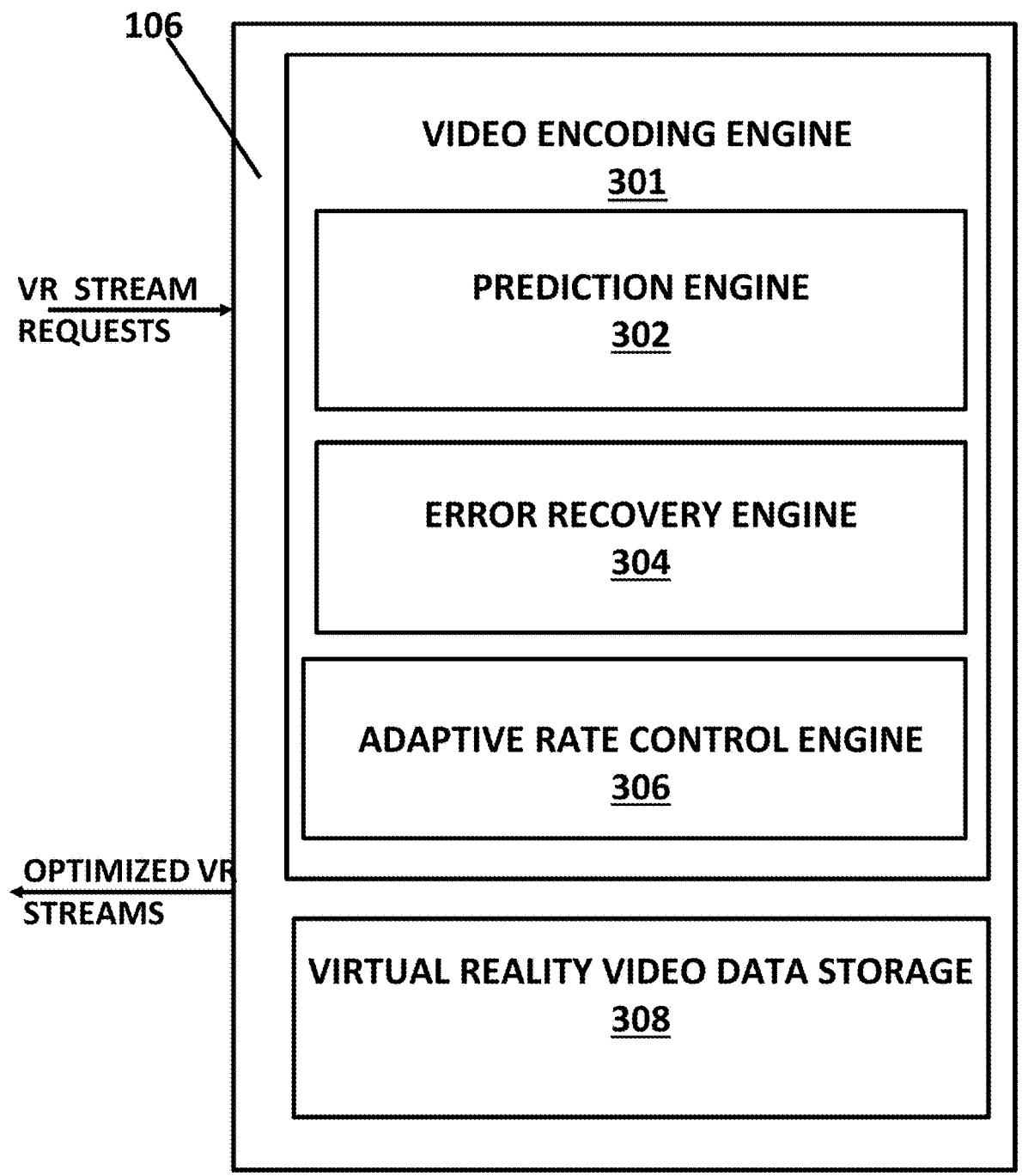
FIG. 3 illustrates more details of the virtual reality data backend that is part of the system in FIG. 1.

FIG. 3 illustrates more details of the virtual reality data backend 106 that is part of the system in FIG. 1 that provides the zero delay architecture. In one implementation, the virtual reality data backend 106 may be cloud based and may be implemented using various known cloud computing resources including processor(s), memory, servers, etc. hosted in the cloud such as Amazon AWS components. The virtual reality data backend 106 may receive a virtual reality stream request from each virtual reality device 102 of the system (wherein each virtual reality stream request may be different from each virtual reality device 102 may be viewing the same or a different piece of virtual reality data and each virtual reality device 102 may have a particular field of view that may be the same or different from the other virtual reality devices 102) and then generate an optimized virtual reality stream for each virtual reality device 102. In one implementation, the system may be a FOV based virtual reality system that is capable of handling a plurality of virtual reality data requests and may be scaled as needed by employing additional cloud computing resources.

The virtual reality data backend 106 may include a video encoding engine 301 and a virtual reality video data storage 308. The video encoding engine 301 may be implemented in hardware, software or a specially designed piece of hardware that performs the video encoding as described below. When the video encoding engine 301 is implemented in software, it may have a plurality of lines of computer code/instructions that may be executed by one or more processors of a computer system (that may also have a memory and other elements of computer system) so that the processor(s) or computer system are configured to perform the operations of the video encoding engine as described below. When the video encoding engine 301 is implemented in hardware, it may be a hardware device, ASIC, integrated circuit, DSP, micro-controller, etc. that can perform the operations of the video encoding engine as described below. The virtual reality video data storage 308 may be hardware or software based storage.

The video encoding engine 301 may perform various virtual reality data processing processes in response to each virtual reality data request from each virtual reality data device 102. For example, the video encoding engine 301 may perform a prediction process, an error recovery process and an adaptive rate control process as described below. The virtual reality video data storage 308 may store data used by the system in FIG. 1 including, for example, user data, data about the characteristics of each type of virtual reality device 102 that may request virtual reality data, field of view (FOV) data stored for a plurality of different pieces of virtual reality data content (an "asset") and/or data for each virtual reality data asset that may be streamed using the system in FIG. 1.

The video encoding engine 301 may further comprise a prediction engine 302, an error recovery engine 304 and an adaptive rate control engine 306. The prediction engine 302 may utilize a prediction algorithm that refines known virtual reality device headset prediction using advanced cloud-based prediction and machine learning as described below to ensure a zero delay virtual reality data delivery experience. The error recovery engine 304 may perform virtual reality data error recovery including packet recovery as described below. The adaptive rate control engine 306 may perform elastic adaptive rate control using an algorithm. Each of these elements video encoding engine 301 may be implemented in hardware or software as described above and may provide a technical solution to the technical problem with typical virtual reality streaming system as described above.

Prediction for Zero-Delay Virtual Reality Experience

The basic prediction of the end-to-end VR system is extracted from the headset, which has built-in hardware components like a gyroscope and other sensors, capable of making very precise movement predictions. As an example, when a user is moving his head in one direction, most advanced mobile phones and Head Mounted Devices (HMD) like the Oculus Rift can give a prediction of movement in the near future of up to 120 ms. However, in a system designed for low-delay delivery, and streaming content on top of UDP-based protocols, being able to know in advance the position of the headset can be communicated back to the backend 106 ahead of time, such that the expected FOV can be delivered back to each player in the virtual reality device before or when it is time for each player in the virtual reality device to render the virtual reality data FOV frames for the user.

Figure 4:
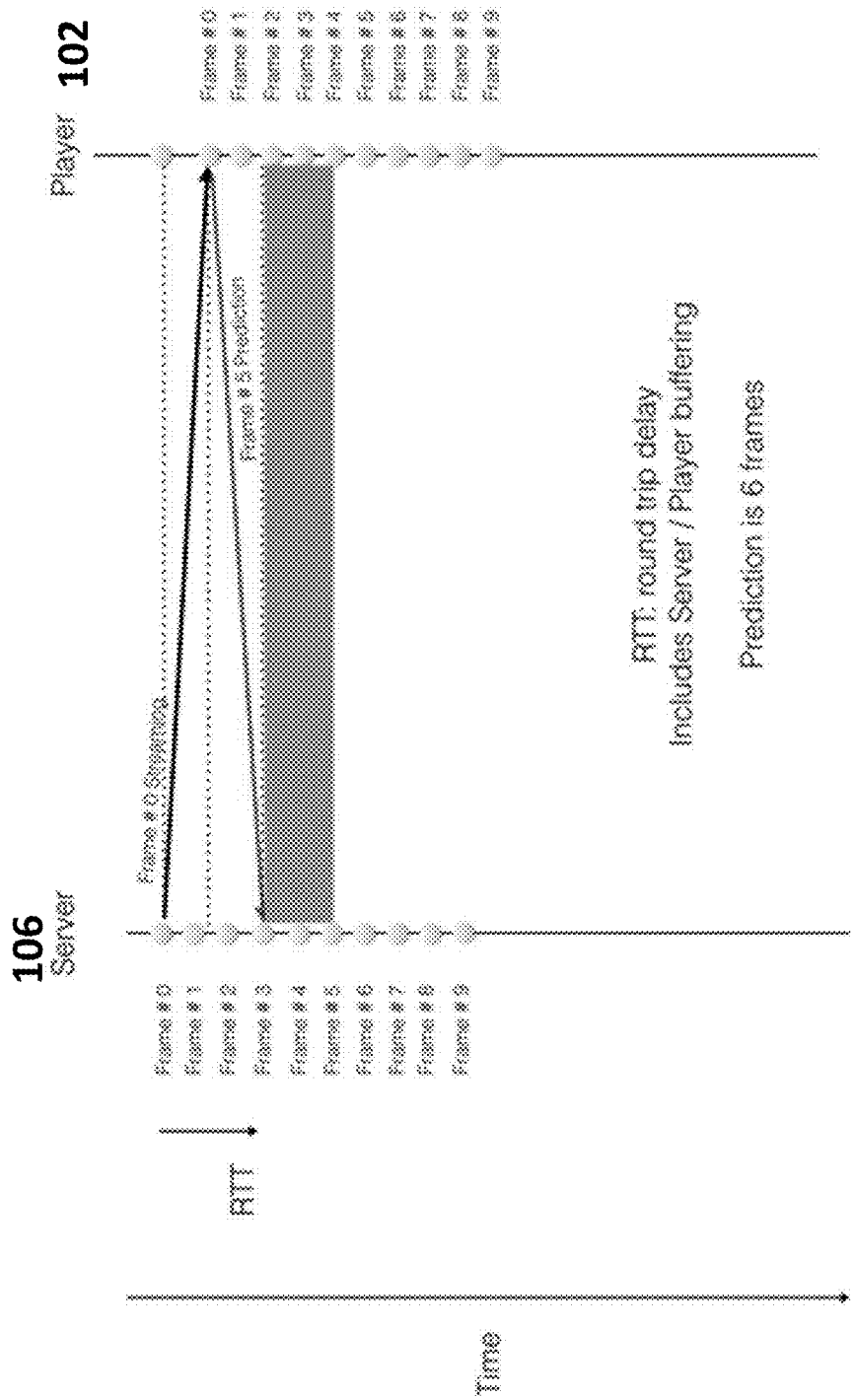
FIG. 4 illustrates an example of virtual reality data flow between a player of a virtual reality device and the backend of the system.

FIG. 4 illustrates a virtual reality data flow between a player of a virtual reality device 102 and the backend 106 of the system. In the example in FIG. 4, a scenario is shown in which the prediction time (6 frames) is greater than the round-trip time (RTT) of communication of data between the player and the backend (including buffering at each end). As shown in FIG. 4 by the green shaded region, the player is thus able to receive the proper FOV before or when the player needs to render the FOV. In the streaming system 100 shown in FIG. 1, the backend 106 (that may be cloud based) may further comprises a plurality of server computers (implemented using cloud resources and residing in the cloud) wherein each server computer has the elements shown in FIG. 3. The plurality of server computers may be distributed over different geographic locations to insure that the round-trip delay (RTT) (that may be, for example, 2 to 100 ms) is always smaller or equal to the prediction (that may be, for example, between 100 and 200 ms) that can be obtained from a specific virtual reality device. Because the system 100 (and each server computer) is aware of the class of virtual reality devices 102 connecting to its backend 106, the backend 106 and each server computer may include the prediction engine 302 that performs machine learning to learn, over time. The machine learning may be used to refine a prediction algorithm by looking at the different RTT vs. Prediction and classifying the table by device type, geo-location, content being watched, etc. The following exemplary characteristics from each of the players:

prediction quality on a per device type
user heat-map of specific 360 assets
network characteristics per geo-location impacting the average, min, max and variance of the round-trip delay
rate of packet loss per user . . . .

The prediction quality, for example, may be measured by whether or not the system is always able to render the frame on time at the player side so that, for example, if all of the frames are rendered on time, then the prediction quality is 100%.

The user heat map indicates what are the most FOV viewed on a per virtual reality data asset basis. The user heat map information, over time, allows the system to predict the next FOV to deliver, based on the current FOV. For example, a tennis game will have most of views from left to right following the ball if the view point is form the side of the court.

The geo-location impacts the RTT, as well as the packet loss percentage. For example, once the prediction engine determines that South America has a packet loss ratio of 5% for example, and that RTT fluctuate between 80 and 120 ms, prediction algorithm may be adapted by the system.

Through extraction of this non-exhaustive list of analytics/characteristics, a cloud-based prediction (using the prediction engine 302) can be refined over time that provides an extra layer of prediction on the backend 106 that improves the overall prediction quality as compared to the basic one extracted from the individual players. The prediction is being able to determine which frame to send ahead of time. For example, if the user is currently viewing frame X on the player and the cloud backend 106 can predict six frames ahead, it means that when the player is playing frame X, the backend can be processing frame X+6 already, such that it is able to send the X+6 ahead of time to the player for on-time rendering. Overall, this leads to a more accurate FOV prediction, generating a higher percentage of perfect alignment of the desired vs actual FOV rendered on the display of the virtual reality device by the player.

Video-Aware Network Abstraction Layer for Best Quality Streaming with Optimal Packet Recovery Existing over the top (OTT) streaming architecture are based on HTTP download infrastructures, which are not a good solution for low-delay applications like virtual reality when performing FOV based streaming. As an example, when the player is currently downloading a chunk of 2 seconds mapping to a specific FOV, the player will not be able to switch to a new FOV before finishing downloading and rendering the current chunk of video. This is a technical problem with existing virtual reality streaming systems. Some existing system, to overcome this issue, have been designed to compensate through parallel download of potential FOVs. As a result, the bandwidth usage on the last mile between the backend and the player is a factor of the maximum network capacity, not the needed bitrate to render the best video quality. These are technical problems with existing streaming systems.

The system 100 provides a technical solution to these problem by providing a system in which the backend 106 (and its server computers) streams data at a rate that is based on the current capacity of the network between the backend 106 and the virtual reality devices 102, but with the maximum rate being set to the rate needed for optimal video quality.

Figure 5:
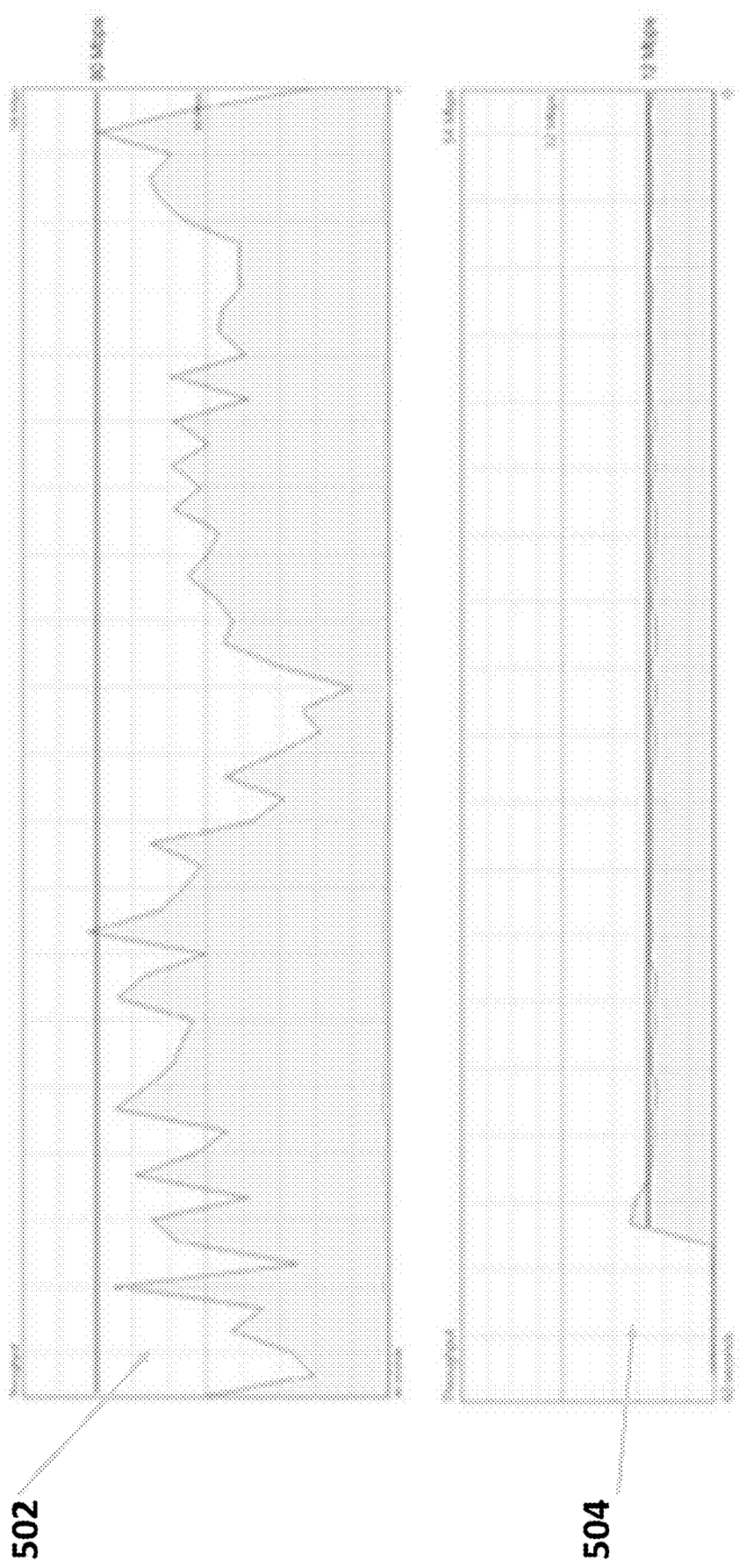
FIG. 5 illustrates bandwidth for a typical FOV-based virtual reality system and for the streaming virtual reality data system 100.

For example, as shown in FIG. 5, a bandwidth over time 502 for a typical FOV based virtual reality system is compared against the bandwidth 504 of the system 100 of FIG. 1. If a specific FOV size needs 12 Mbps in H264 to insure optimal video quality for a great user experience, a typical system, to achieve the same quality with HTTP download when the user moves view points, requires a total bandwidth utilization that will spike at a very high rate from time to time depending on how many FOVs are being downloaded in parallel as shown in FIG. 5 for the typical system bandwidth 502. In addition, since the player is the one controlling the download, there is no notion of video quality in this schema, as the download speed is purely driven from the total available bandwidth. Thus, in FIG. 5, the bandwidth 502 for the HTTP downloads spike all the way to 80 Mbps, which is the max speed allowed on the network that was under test. By controlling the last mile from the server side, through streaming of the required FOV, the system 100 insures best video quality at the most optimal bitrate 504 (12 Mbps in this example) This allows precious last mile bandwidth, often over LTE for mobile, to be controlled better, reducing overall network congestion, and reducing the cost of streaming per user.

Figure 6:
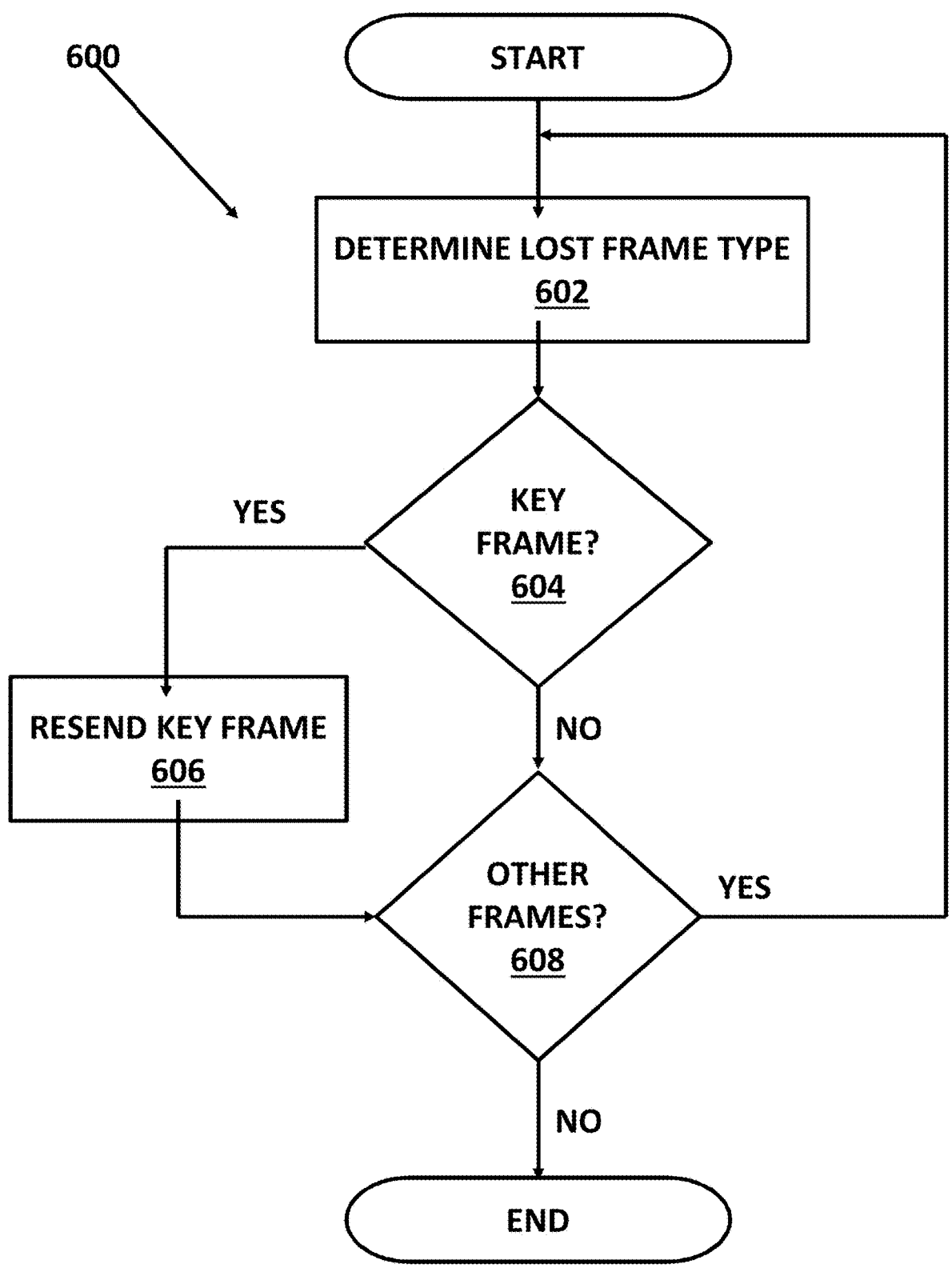
FIG. 6 illustrates a method for error recovery for virtual reality data.

The system may also implement a video aware abstraction layer to deal with packet recovery that may be implemented in the error recovery engine 304 shown in FIG. 3 or may be implemented in an error recovery engine that is part of each player of each virtual reality device. Legacy systems only look at the network layer to recover packets and treat any kind of video data the same way. In the system 100, the encoding may use a group of pictures (GOP) scheme and various different types of frames including an I frame that is a frame which is least compressible, but does not require other frames to decode (a key frame), a P frame that uses data from previous frames to decompress and is more compressible than an I frame and a B frame that may use both previous and forward frames for data reference and have the highest compression level. The system 100 (and the error recovery engine 304) is aware of the frame type currently being streamed and may implement an error recovery method 600 as shown in FIG. 6. When a packet has been lost, the error recovery engine 304 may determine the type of lost frame (602). The error recovery may become aware of the lost packet/frame when a player of a particular virtual reality device notifies the backend of packet loss or may determine that a packet has been lost based on the known data protocols.

The error recovery engine 304 may then determine if the lost frame is a key frame (604). If the lost frame is a key frame (an I frame), the error recovery engine may request a resend of key frames (606) since the loss of these key frames is very expensive for all sub-sequent frames belonging to this GOP. However, if the lost frame is not a key frame, such as the loss of a B frame for example, the few frames impacted by such a loss will be repeated after decoding of the previous frame at the player side without the need to resend. The error recovery engine may then determine if other frames are lost and loop back to determine the type of lost frame or the method is complete. By being video selective at the network layer, the system 100 implements a new class of video recovery, by only re-sending data that is considered necessary to recover, while relying on more basic player recovery to deal with loss data that is not considered worth resending.

Elastic Video Rate Control

Standard video codecs have their rate control driven by the Video Buffer Verifier (VBV). For encoding solutions that do not need to perform in a low delay environment, the VBV is usually set between 1 and 4 seconds in order for the rate control to take advantage of a big buffer to play with when generating the bitstream before it gets sent to the player. For example, a hard scene change can be easily handled with a big enough VBV buffer, by letting a big key frame leaking into the buffer, and taking advantage of lowering the size of the subsequent and less important P and B frames.

When dealing with the requirement of encoding the content with the lowest delay possible (since any delay between encode and player is adding to the overall round-trip delay), legacy encoders reduce the VBV size to a smaller number (4 frames for example—64 ms for 60 fps content), to base their rate control on a smaller buffer, allowing the generated stream to exit the encoder sooner than later. This has the drawback to degrade the quality, as encoder gets less buffer to budget with. The above is a technical problem with existing virtual reality systems for low delay virtual reality such as a streaming FOV type systems.

The system 100 (and in particular the adaptive rate control engine 306 in some implementations) provides a technical solution to the above problem by providing an elastic VBV model for low delay encoding. As described above, the system 100 is aware of the current RTT time between the backend 106 and a player and compares it against the current prediction time. As shown in FIG. 4, the prediction is bigger than the RTT and gives the pipeline an extra 2 frames. The system 100 adapts to the change in pipeline, by adding 2 more frames as part of the VBV (implemented in the adaptive rate control engine 306 in some implementations) that allows the rate control to plan with two more frames. At any point in time later when a change in prediction quality and a change of RTT (jitter in the network) is detected, the VBV will get adjusted accordingly to a new number of frames. For example, in the example in FIG. 4, the RTT may be formed of 2 frames of VBV and 2 frames of RTT. However, since the system determines that it has 2 extra frames available, the system 100 can extend the VBV to 4 frames.

By adjusting the VBV in an elastic way, following the fluctuations of the RTT vs Prediction (Extra VBV=Prediction—RTT for example), the system 100 rate control utilizes the VBV in an optimal way, generating the best video quality possible based on the maximum VBV doable at any point of time.

Optimal Adaptive Bitrate Streaming for FOV-Based VR Streaming

A video streaming architecture cannot work without a proper adaptive bitrate design, where the streaming bandwidth adapts based on the network bandwidth availability. To achieve this for VR, legacy solutions are being applied that rely on the adaptive model implemented for HTTP download models. For example, a player measures how long it takes to download a current chunk of video, and derives its current network bandwidth. Once the network bandwidth is approximated, the player decides to request the next chunk at the same bitrate, or higher bitrate if bandwidth is big enough, and finally lower bitrate if the player finds it took longer to download the last chunk. The above is a technical problem with existing virtual reality systems for low delay virtual reality such as a streaming FOV type systems.

The system 100 (and in particular the adaptive rate control engine 306 in some implementations) provides a technical solution to the above problem and implements an adaptive model that follows the HTTP download model, except that the switching from one chunk to the next is driven by the backend 106 (the adaptive rate control engine 306 for example), not the player. However, there is no need to be able to switch between rates on any frame and it is fine to wait for the next key frame to come before increasing or decreasing the bitrate by switching to a new stream. As a result, there is no need to have zig-zag streams (allowing the player to switch between different FOVs) at different bitrates. Thus, the backend 106 may generate and stream just the linear FOV streams at different rates from optimal rate that insures best Video Quality to lower rates.

The backend 106 may thus use a different number of FOVs while mapping the 360 world for different target bitrates. As an example, at high bitrates, to reduce the number of FOVs, and thus the number of switches between views, the backend 306 may use less FOVs to cover the panoramic view. However, when decreasing bitrates per FOV for adaptive purposes, the backend 106 is also increasing the number of FOVs, to actually reduce the number of pixels per view to encode. As seen in a regular OTT service, it is more optimal in terms of video quality to reduce both bitrate and number of pixels to encode. As such, the backend 106 is implementing an adaptive streaming model, with adaptive rates switch happening at key frame boundaries, and with varying number of FOVs per rate range varying from few at high bitrate, to many at lower bitrates. A range example is 15 FOVs for the highest bitrate range (10 Mbps for stereo content encoded with HEVC for optimal quality of today's headsets) insuring optimal Video Quality, to 50 FOVs for low bitrates insuring live streaming at marginal rates, below 1 Mbps.

Adapting to User Movements

The adaptive rate method described above for adapting bitrate based on network availability through different number of FOVs per bitrate range can also be used to adapt to user movements. Because the FOV switching implemented with FullVR is tuned to a pre-determined maximum movement from frame to frame, it could happen that it might not fit some users who could be moving faster and be always outside of the next FOV neighbor. The same way multiple bitrate profiles can be generated, multiple profiles can be generated with different number of FOVs per 360 view, that will allow different speeds of movements. For example, if the server finds out that FOV switching from medium-movement profile is always ending up having the next neighbor not matching the actual user position, the server will be able to switch to a new high-movement profile while reaching the next key-frame or chunk boundary. In this way, the backend 106 is adding another level of adaptiveness to its architecture by being able to adapt to user headset speed of movements.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection; however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, micro-controllers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A streaming virtual reality data system, comprising:
    a virtual reality data backend having a plurality of geographically distributed server computers;
    a plurality of virtual reality devices connected to the virtual reality data backend, each virtual reality device having a head mounted display that generates a set of prediction data about movement of the head mounted display, each virtual reality device connecting to a particular server computer of the virtual reality data backend so that a round-trip time for virtual reality data between each virtual reality device and the particular server computer is less than a prediction time; and
    each server computer having a prediction engine that generates a set of characteristics for each virtual reality device coupled to the virtual reality data backend and predicts a field of view for each virtual reality device based in part on the set of generated characteristics.

2. The system of claim 1, wherein the set of generated characteristics further comprises one or more of prediction quality on a per device type, a user heat-map of specific virtual reality data, network characteristics per geo-location impacting the average, min, max and variance of the round-trip delay and a rate of packet loss per user.

3. The system of claim 1, wherein the prediction engine further comprises a machine learning element that generates the set of characteristics and predicts the field of view for each virtual reality device based in part on the set of generated characteristics.

4. The system of claim 1, wherein each virtual reality device connects to a particular server computer of the virtual reality data backend so that a round-trip time for virtual reality data between the virtual reality device and the particular server computer is equal or smaller compared to the prediction time.

5. The system of claim 1, wherein the backend further comprises an error recovery engine that recovers from virtual reality data packet loss.

6. The system of claim 5, wherein the error recovery engine determines a type of the frame of virtual reality data that is lost and resends the lost data packet when the lost data packet contains a key frame.

7. The system of claim 1, wherein the backend further comprises an adaptive rate control engine that adjusts a number of frames in a video buffer based on the set of generated characteristics.

8. The system of claim 7, wherein the adjusted number of frames in the video buffer, for each virtual reality device, is determined based on a prediction quality characteristics value subtracted from a round trip time characteristic reflecting a time that virtual reality data travels between each virtual reality device and the backend.

9. The system of claim 1, wherein the backend further comprises an adaptive rate control engine that encodes a different total number of field of views for each bitrate range or profile.

10. The system of claim 1, wherein the backend further comprises an adaptive rate control engine that adapts a bitrate to a movement characteristics of each virtual reality device headset.

11. A method for streaming virtual reality field of view data, the method comprising:
providing a virtual reality data backend having a plurality of geographically distributed server computers and a plurality of virtual reality devices connected to the virtual reality data backend, each virtual reality device having a head mounted display that generates a set of prediction data about movement of the head mounted display, each virtual reality device connecting to a particular server computer of the virtual reality data backend so that a round-trip time for virtual reality data between each virtual reality device and the particular server computer is less than a prediction time;
generating a set of characteristics for each virtual reality device coupled to the virtual reality data backend; and
predicting a field of view for each virtual reality device based in part on the set of generated characteristics.

12. The method of claim 11, wherein the set of generated characteristics further comprises one or more of prediction quality on a per device type, a user heat-map of specific virtual reality data, network characteristics per geo-location impacting the average, min, max and variance of the round-trip delay and a rate of packet loss per user.

13. The method of claim 11 further comprising recovering from virtual reality data packet loss.

14. The method of claim 13, wherein recovering from virtual reality data packet loss further comprises determining a type of the frame of virtual reality data that is lost and resending the lost data packet when the lost data packet contains a key frame.

15. The method of claim 11 further comprising adjusting a number of frames in a video buffer based on the set of generated characteristics.

16. The method of claim 15, wherein adjusting the number of frames further comprises adjusting the number of frames based on a prediction quality characteristics value subtracted from a round trip time characteristic reflecting a time that virtual reality data travels between each virtual reality device and the backend.

17. The method of claim 11 further comprising encoding a different total number of field of views for each bitrate range or profile.

18. The method of claim 11 further comprising adapting a bitrate to a movement characteristics of each virtual reality device headset.

* * * * *